(12) United States Patent
Bohn

(10) Patent No.: US 6,184,515 B1
(45) Date of Patent: Feb. 6, 2001

(54) EXPANDABLE HAND SCANNER WITH LENS REDUCTION OPTICS

(75) Inventor: David D. Bohn, Fort Collins, CO (US)

(73) Assignee: Hewlett-Packard Company, Palo Alto, CA (US)

( * ) Notice: Under 35 U.S.C. 154(b), the term of this patent shall be extended for 0 days.

(21) Appl. No.: 09/245,473

(22) Filed: Feb. 5, 1999

(51) Int. Cl.[7] .......................... H01L 27/00; H04N 1/024
(52) U.S. Cl. ........................................ 250/208.1; 358/473
(58) Field of Search .................................. 250/566, 208.1, 250/234; 235/462.11, 462.13, 462.41, 462.45, 472.01; 358/473, 483, 494, 497

(56) References Cited

U.S. PATENT DOCUMENTS

| | | | |
|---|---|---|---|
| 4,926,041 | 5/1990 | Boyd | 250/226 |
| 5,285,056 * | 2/1994 | Tedesco et al. | 235/462.45 |
| 5,300,767 | 4/1994 | Steinle et al. | 250/208.1 |
| 5,306,908 | 4/1994 | McConica et al. | 250/234 |
| 5,381,020 | 1/1995 | Kochis et al. | 250/566 |
| 5,552,597 | 9/1996 | McConica | 250/234 |
| 5,586,212 | 12/1996 | McConica et al. | 385/146 |

* cited by examiner

Primary Examiner—F. L. Evans

(57) ABSTRACT

Expandable scanner apparatus may comprise a main body with a detector mounted therein. A contact head mounted to the main body can be moved toward and away from the main body between a retracted position and an extended position. An optical system operatively associated with the main body and the contact head focuses on the detector image light from an object being scanned when the contact head is in the extended position.

19 Claims, 4 Drawing Sheets

EXPANDABLE HAND SCANNER WITH LENS REDUCTION OPTICS

FIELD OF INVENTION

This invention relates to hand held or portable image scanners in general and more specifically to a portable image scanner that is expandable to scan full size documents.

BACKGROUND

Optical scanner devices are well-known in the art and may be used to produce machine-readable image data signals that are representative of a scanned object, such as a photograph or a page of printed text. In a typical scanner application, the image data signals produced by an optical scanner may be used by a personal computer to reproduce an image of the scanned object on a suitable display device, such as a CRT or a printer.

A hand-held or portable optical scanner is an optical scanner which is designed to be moved by hand across the object or document being scanned. The hand-held scanner may be connected directly to a separate computer by a data cable. If so, the data signals produced by the hand-held scanner may be transferred to the separate computer "on the fly," i.e., as the image data are collected. Alternatively, the hand-scanner may include an on-board data storage system for storing the image data. The image data may then be downloaded to a separate computer after the scanning operation is complete via any convenient means, such as a cable or an optical infrared data link.

Hand-held or portable optical scanners are well-known in the art and various components thereof are disclosed in U.S. Pat. No. 5,552,597 of McConica for "Hand-Held Scanner having Adjustable Light Path", U.S. Pat. No. 5,586,212 of McConica, et al., for "Optical Wave Guide for Hand-Held Scanner," U.S. Pat. No. 5,381,020 of Kochis, et al., for "Hand-Held Optical Scanner with Onboard Battery Recharging Assembly," and U.S. Pat. No. 5,306,908 of McConica, et al., for "Manually Operated Hand-Held Optical Scanner with Tactile Speed Control Assembly," all of which are hereby incorporated by reference for all that they disclose.

A typical hand-held optical scanner may include illumination and optical systems to accomplish scanning of the object. The illumination system illuminates a portion of the object (commonly referred to as a "scan region"), whereas the optical system collects light reflected by the illuminated scan region and focuses a small area of the illuminated scan region (commonly referred to as a "scan line") onto the surface of a photosensitive detector positioned within the scanner. Image data representative of the entire object then may be obtained by sweeping the scan line across the entire object, usually by moving the hand-held scanner with respect to the object. By way of example, the illumination system may include a plurality of light emitting diodes (LEDs), although other types of light sources, such as fluorescent or incandescent lamps, may also be used.

A typical scanner optical system will include a slit aperture and lens assembly to focus the image of the scan line onto the surface of the detector. Depending on the particular design, the scanner optical system may also include one or more mirrors to "fold" the path of the image light, thus allowing the optical system to be conveniently mounted within a relatively small enclosure. In order to allow a smaller detector array to be used, most optical systems also reduce the size of the image of the scan line that is focused onto the surface of the detector. For example, many optical systems have a lens reduction ratio of about 8:1, which reduces the size of the image of the scan line by a factor of about 8. Such optical systems may be referred to herein in the alternative as "lens reduction" optical systems. In an alternative arrangement, the optical system may include a "contact image sensor" or CIS to focus the image of the illuminated scan line onto the surface of the detector.

The photosensitive detector used to detect the image light focused thereon by the optical system typically comprises a charge-coupled device (CCD), although other devices may be used. A typical CCD may comprise an array of individual cells or "pixels," each of which collects or builds-up an electrical charge in response to exposure to light. Since the quantity of the accumulated electrical charge in any given cell or pixel is related to the intensity and duration of the light exposure, a CCD may be used to detect light and dark spots of an image focused thereon.

The term "image light" as used herein refers to the light that is focused onto the surface of the detector array by the optical system. Depending on the type of scanner and the type of document, the image light may be reflected from the object being scanned or it may be transmitted through the object. The image light may be converted into digital signals in essentially three steps. First, each pixel in the CCD detector converts the light it receives into an electric charge. Second, the charges from the pixels are converted into analog voltages by an analog amplifier. Finally, the analog voltages are digitized by an analog-to-digital (A/D) converter. The digital signals then may be processed and/or stored as desired.

Generally speaking, the portable or hand-held scanners of the type described above may be classified into one of two size groups: Full size and miniature. As its name implies, full size hand scanners are sized so that they may scan a full size document (e.g., letter or legal sized paper) in a single pass. Accordingly, the full size scanner will typically have a scan line length that is approximately commensurate with the shortest dimension of the document to be scanned, e.g., typically about 8.5 to 9 inches or so. While such full size scanners exist and work well, they are not particularly "portable" particularly if they utilize "lens reduction" optical systems, which typically have long optical paths requiring a substantial amount of space. While the overall size of a full size scanner can be reduced by utilizing a CIS optical system, such CIS optical systems generally provide for reduced image quality compared to lens reduction optical systems. Moreover, the color performance of such CIS systems is typically poor, making them unsuitable for use in color scanners.

Miniature scanners are generally considerably smaller than full-size scanners and typically have a scan line length of no more than about 4.5 to 5 inches. As a result, most miniature scanners require multiple passes in order to scan a full size document. While such multiple pass scanning can be performed, it generally requires that the scanner be provided with some type of navigation system to allow the scanner to track its position over the document being scanned. Position data produced by the navigation system allows the image data collected during multiple scanning passes to be later combined or "stitched" together in order to produce image data representative of the entirety of the scanned object. While such scanner navigation systems are known and being used, they are complex and add to the overall cost of the scanner. Also, in order to keep the overall size of such miniature scanners to a minimum, most miniature scanners forego lens reduction optical systems in favor of CIS optical systems. Unfortunately, however, as discussed above, most CIS systems suffer from poor image quality and color performance when compared to lens reduction optical systems.

Consequently, a need exists for a miniature scanner that is capable of scanning full sized documents with a single pass, yet still be small enough to be considered portable. Such a scanner would thereby dispense with the need for an expensive and complex scanner navigation system. Additional advantages could be achieved if such a scanner utilized a high performance optical system, but without significantly impacting the portability of the scanner. Still other advantages could be realized if such a portable scanner were capable of color scanning.

SUMMARY OF THE INVENTION

Expandable scanner apparatus may comprise a main body with a detector mounted therein. A contact head is mounted to the main body so that the contact head can be moved toward and away from the main body between a retracted position and an extended position. An optical system operatively associated with the main body and the contact head focuses on the detector image light from an object being scanned when the contact head is in the extended position.

Also disclosed is a method for scanning an object that comprises the steps of: Providing a expandable scanner apparatus having a main body portion with a detector mounted therein, a contact head portion mounted to the main body portion so that the contact head portion can be moved toward and away from the main body portion between a retracted position and an extended position, and an optical system operatively associated with the main body portion and the contact head portion so that the optical system focuses on the detector image light from the object being scanned when the contact head is in the extended position; moving the contact head portion to the extended position; and moving the expandable scanner apparatus over the object.

BRIEF DESCRIPTION OF THE DRAWING

Illustrative and presently preferred embodiments of the invention are shown in the accompanying drawing in which.

DETAILED DESCRIPTION OF THE INVENTION

Figure 1:
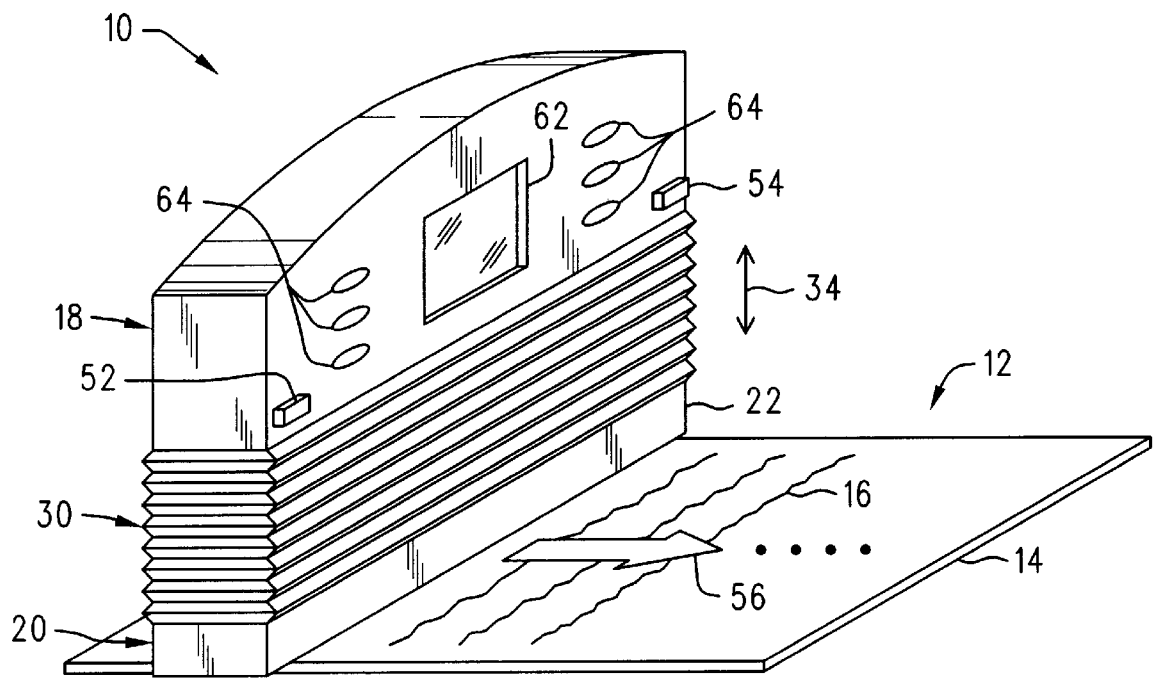
FIG. 1 is a perspective view of an expandable scanner apparatus in the expanded position being used to scan a document with written text thereon.

An expandable scanner apparatus 10 according to one preferred embodiment of the present invention is shown in FIG. 1 as it could be used to scan an object 12, such as a document 14 with written text 16 provided thereon. The expandable scanner apparatus 10 may comprise a main body portion 18 and a contact head portion 20. The contact head portion 20 is mounted to the main body portion 18 so that the contact head portion 20 may be moved toward and away from the main body portion 18 (i.e., in the directions indicated by arrow 34), between an extended position 22 (shown in FIG. 1) and a retracted position 22' (shown in FIG. 2). In one preferred embodiment, the scanner 10 also may be provided with an expandable bellows assembly 30 which substantially encloses a space 32 (FIG. 3) created between the main body portion 18 and the contact head portion 20 when the contact head portion 20 is in the extended position 22.

Figure 3:
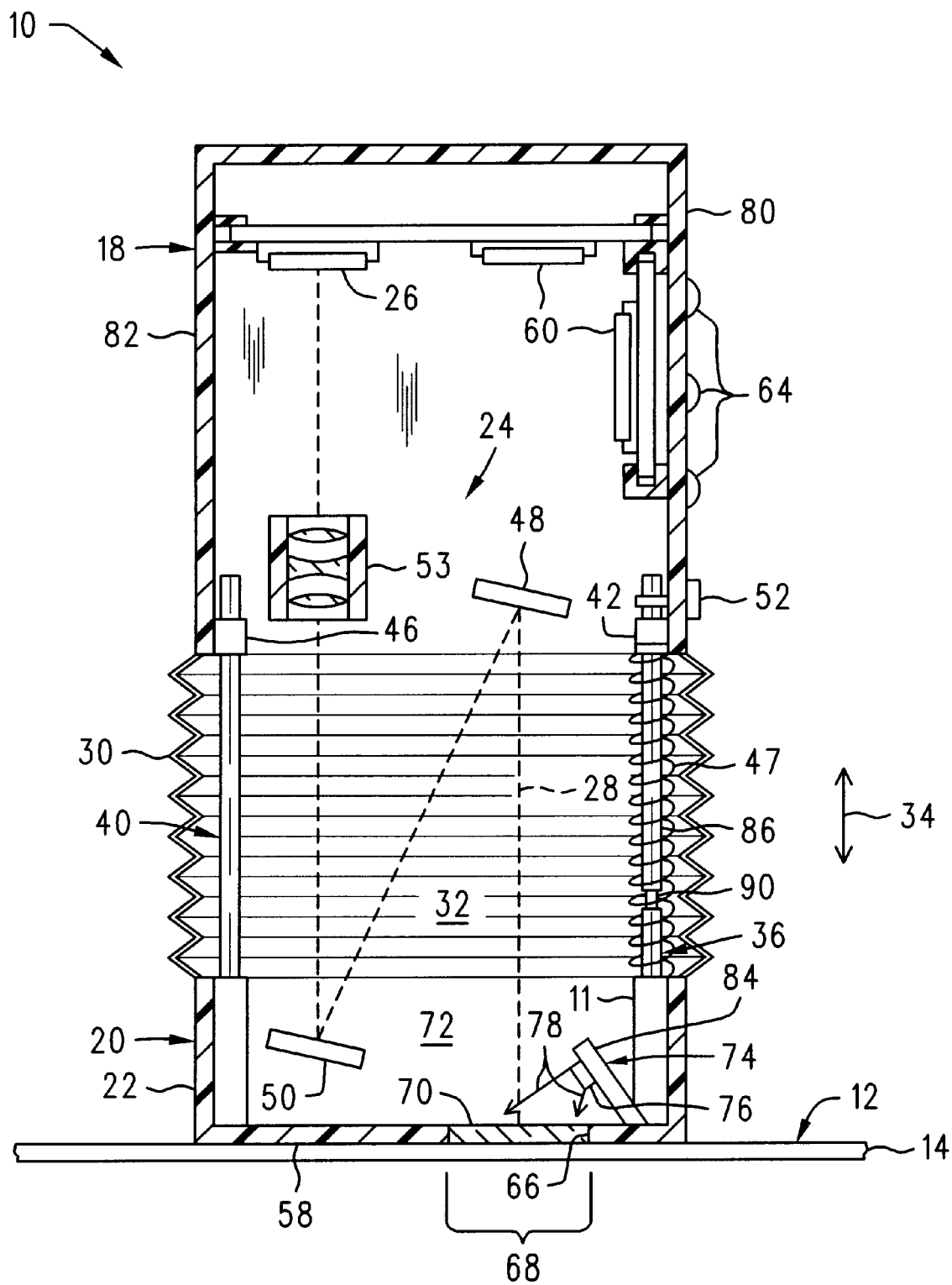
FIG. 3 is a side view in elevation of the scanner in the expanded position showing the arrangement of the mirrors and lens assembly of the optical system.

Referring now primarily to FIG. 3, the expandable scanner 10 may be provided with a "lens-reduction" optical system 24 that is operatively associated with the main body portion 18 and the contact head portion 20 so that the optical system 24 focuses on the detector 26 image light 28 from the object 12 being scanned when the contact head portion 20 is in the extended position 22. More specifically, in one preferred embodiment, the optical system 24 may comprise a first reflector or mirror assembly 48 mounted within the main body portion 18 of scanner 10 and a second reflector or mirror assembly 50 mounted within the contact head portion 20. The optical system 24 may also be provided with a lens assembly 53 which, in one preferred embodiment, may be mounted within the main body portion 18 of scanner 10 in the manner best seen in FIG. 4. The arrangement of the first and second mirror assemblies 48 and 50, as well as the lens assembly 53 is such that when the contact head portion 20 of scanner 10 is in the extended position 22, image light 28 from the object 12 is reflected by the first and second mirror assemblies 48 and 50 to the lens assembly 53, which thereafter focuses the image light 28 onto the detector assembly 26.

Figure 2:
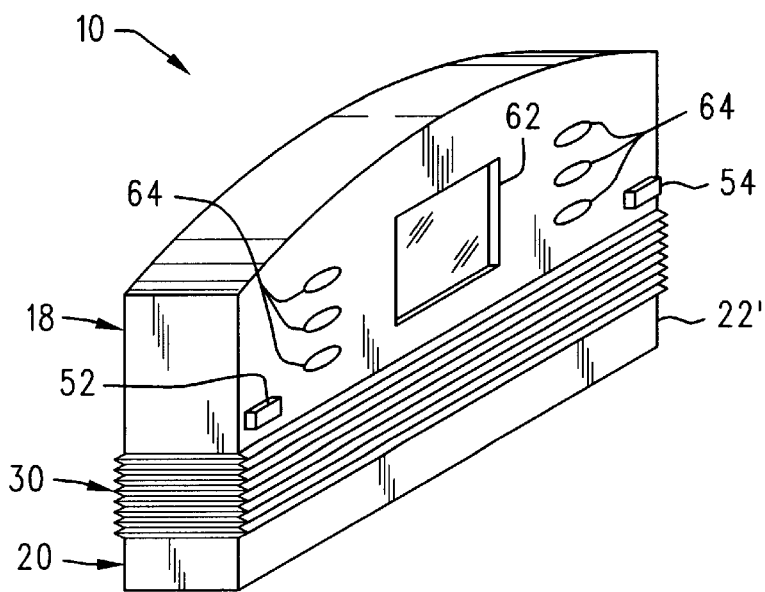
FIG. 2 is a perspective view of the expandable scanner apparatus in the contracted position.
Figure 4:
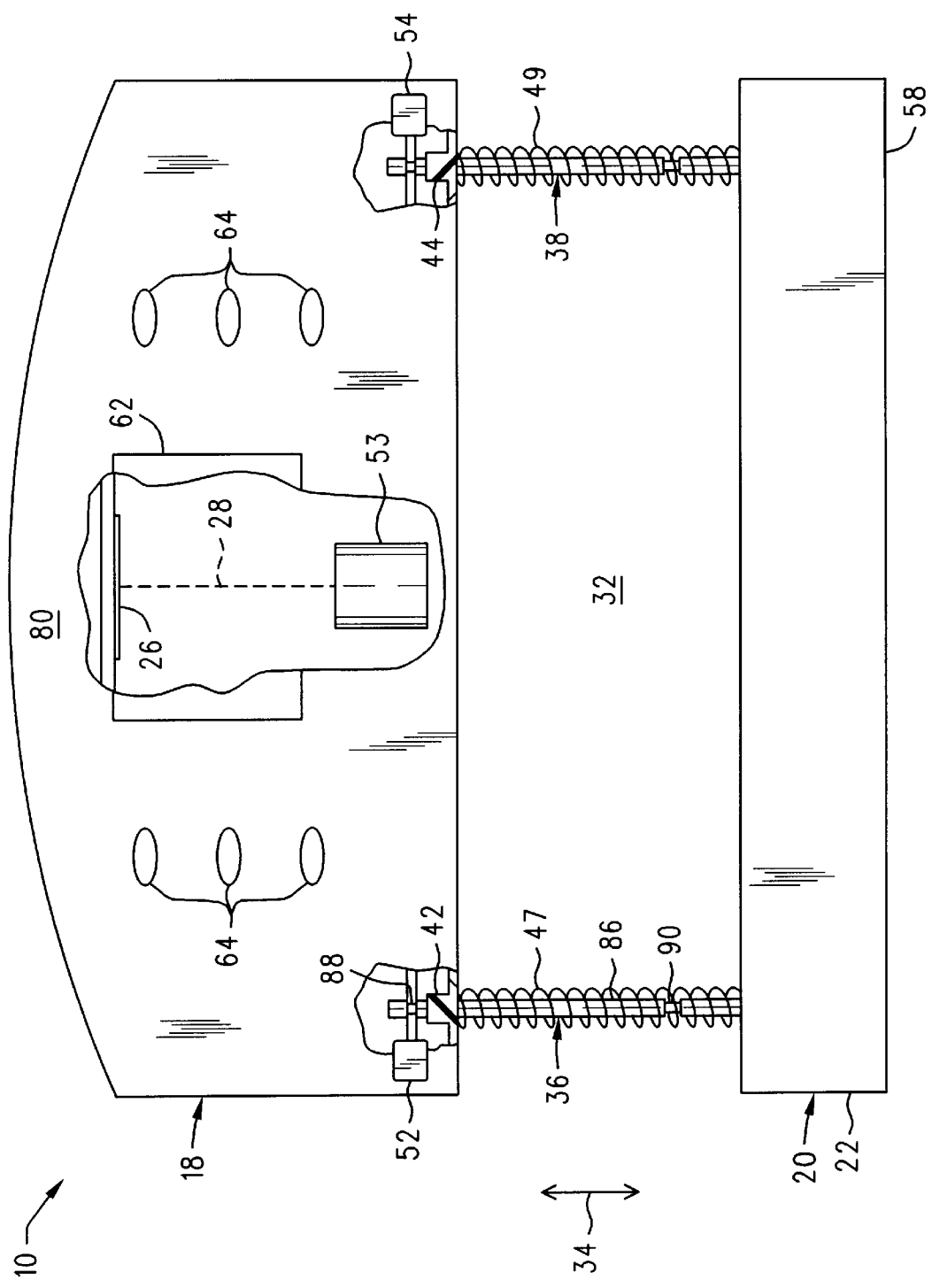
FIG. 4 is a front view in elevation of the scanner in the expanded position with the expandable bellows removed to more clearly show the arrangement of the elongate rod mounting system.

The contact head portion 20 of scanner 10 may be mounted to the main body portion 18 by a plurality of elongate rod assemblies, as best seen in FIGS. 3 and 4. The mounting arrangement allows the contact head portion 20 of scanner 10 to be moved toward and away from the main body portion 18, generally in the directions indicated by arrows 34. By way of example, in one preferred embodiment, the contact head portion 20 may be provided with a front pair of elongate rod assemblies 36 and 38, as well as a rear pair of rod assemblies (only one rod assembly 40 of which can be seen in FIGS. 3 and 4). The rod assemblies (e.g., 36, 38, and 40) are slidably received by corresponding bearing members 42, 44, and 46 provided in the main body portion 18, thereby allowing the contact head portion 20 of scanner 10 to be moved between the extended position 22 (FIG. 1) and the retracted position 22' (FIG. 2). It is preferred, but not required, that a pair of springs 47, 49 be provided to bias the contact head portion 20 in the extended position 22. A pair of latch assemblies 52, 54 may be provided to the main body portion 18 to lock the contact head portion 20 in the extended and retracted positions 22 and 22'.

The expandable scanner 10 may be operated as follows in order to scan an object 12, such as a document 14 with written text 16 provided thereon. Assuming the contact head portion 20 of the scanner 10 is in the retracted position 22' (FIG. 2), the user (not shown) would first prepare the scanner 10 for operation by moving the contact head portion 20 to the extended position 22. In one preferred embodiment, this could be done by simultaneously pushing on the latch members 52 and 54 to release the respective rod members 36 and 38 and then by pulling on the contact head portion 20 to move it away from the main body portion 18. The user would continue to move the contact head portion 20 away from the main body portion 18 until the contact head portion 20 reaches the extended position 22. If the scanner 10 is provided with springs 47, 49 to bias the contact head 20 in the extended position 22, then it would not be necessary for the user to manually pull apart the main body portion 18 and the contact head 20. In any event, once the contact head 20 is in the extended position 22, the latch assemblies 52 and 54 would automatically engage their respective rod assemblies 36 and 38 to lock the contact head portion 20 in the extended position 22. Once the contact head portion 20 is in the extended position 22, the expandable scanner 10 is ready for scanning. That is, the object 12 may be scanned by placing the object side 58 (FIG. 5) of the contact head portion 20 in contact with the object 12 and thereafter by moving the scanner 10 in the scan direction 56, as best seen in FIG. 1. After the scanning operation is complete, the user may return the contact head portion 20 to the retracted position 22' (FIG. 2) by releasing the latch assemblies 52 and 54 and then by pushing the contact head portion 20 toward the main body portion 18. Once the contact head portion 20 has been moved to the retracted position 22', the latch assemblies 52 and 54 would again automatically engage their respective rod assemblies 36 and 38, this time locking the contact head 20 in the retracted position 22'.

A significant advantage of the expandable scanner apparatus 10 according to the present invention is when in the expanded position, the scanner apparatus 10 is capable of scanning a full sized document in a single pass, thereby dispensing with the need to provide the scanner with a complex and expensive navigation system. In an alternative embodiment, the scanner need not be sized to scan a full sized document, but could instead be made smaller, as in the case of miniature scanners. Regardless of whether the scanner comprises a full size or miniature configuration, once the scanning operation is complete, the scanner 10 may then be returned to the contracted position, which substantially increases the portability of the scanner. Accordingly, the present invention realizes the benefits and advantages of both full size and miniature scanners, but without the drawbacks associated with either type. Still yet another advantage of the expandable scanner according to the present invention is that the lens reduction optical system provides superior image quality, thereby allowing the scanner to be used to produce high-quality color image data.

Having briefly described the expandable scanner apparatus 10, as well as some of its more significant features and advantages, the various preferred embodiments of the expandable scanner apparatus according to the present invention will now be described in detail. However, before proceeding with the detailed description, it should be noted that while the expandable scanner apparatus is shown and described herein as it could be used to scan an object 12, such as a document 14 with written text 16 provided thereon, it is not limited to use with any particular type of object 12 or in any particular application. Indeed, the expandable scanner apparatus 10 may be used in almost any conceivable application to scan almost any type of object imaginable. Accordingly, the expandable scanner apparatus 10 according to the present invention should not be regarded as limited to the particular applications and objects shown and described herein.

With the foregoing considerations in mind, one preferred embodiment of the expandable scanner apparatus 10 is shown in FIG. 1 as it could be used to scan an object 12, such as a document 14 with written text 16 provided thereon. The expandable scanner apparatus 10 may comprise three major portions or subassemblies: A main body portion 18, a contact head portion 20, and a bellows assembly 30. The contact head 20 is mounted to the main body portion 18 so that the contact head 20 may be moved between an extended position 22 (FIG. 1) and a retracted position 22' (FIG. 2), i.e., generally in the directions indicated by arrows 34. The bellows assembly 30 substantially encloses the space 32 created between the main body 18 and the contact head 20, as best seen in FIGS. 1 and 3. The foregoing major portions or subassemblies will now be described in detail.

Referring now primarily to FIGS. 1–3, the main body portion 18 of expandable scanner 10 may comprise an overall configuration or shape conducive to hand manipulation by a user (not shown), although other configurations may be used. In one preferred embodiment, the main body portion 18 may be sized to receive the various electronic components 60 (FIG. 3) required for the operation of the expandable image scanner 10. Alternatively, some or all of the various electronic components may be located elsewhere and may be connected to the main body portion 18 by a suitable link, such as by a wire cable or by an optical infrared data link (not shown). The main body portion 18 of expandable scanner 10 may also be provided with a display system 62, such as a liquid crystal display, as well as the various switching devices 64 that may be required or desired for the operation of the expandable image scanner 10. In the embodiment shown and described herein, all of the switching devices 64 are located on the front face of the main body portion 18 of scanner 10. Alternatively, the switching devices 64 may be located at any convenient position on the expandable scanner device 10, as would be obvious to persons having ordinary skill in the art after having become familiar with the present invention. The electrical power required to operate the expandable image scanner 10 may be provided by a suitable electrical power source, such as a battery (not shown), that may also be contained within the main body portion 18 of expandable image scanner 10. Alternatively, the electrical power required by the scanner 10 could be provided by a source external to the scanner 10.

Since the various electronic components, display devices, switching devices, and batteries that may be required or desired for use in a particular portable image scanner are well-known in the art and since descriptions of the various components are not required to understand or practice the present invention, the various components, e.g., electronic components 60, display device 62, switching devices 64, etc., utilized in one preferred embodiment of the present invention will not be described in further detail herein.

The main body portion 18 of the expandable scanner device 10 may be made from any of a wide range of materials (such as metals or plastics) suitable for the intended application. Consequently, the present invention should not be regarded as limited to a main body portion 18 comprising any particular material. By way of example, in one preferred embodiment, the main body portion 18 may be molded from a polycarbonate plastic material of the type that is well-known in the art and readily commercially available.

Figure 5:
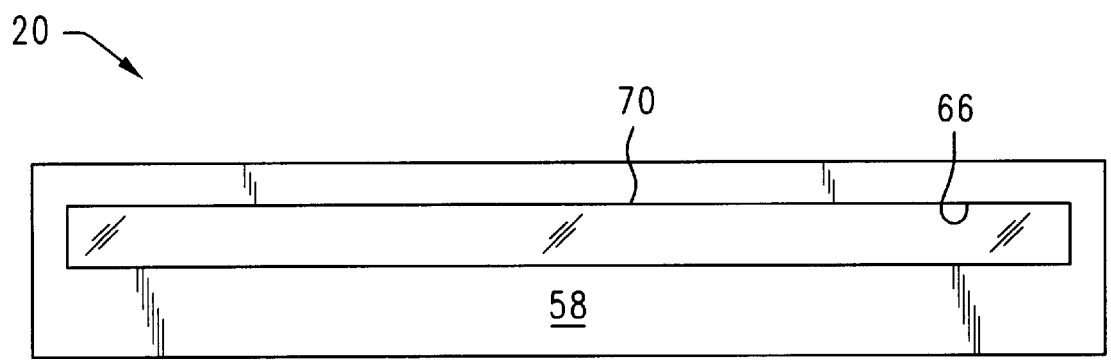
FIG. 5 is a plan view of the object side of the contact head portion of the expandable scanner showing the elongate slit aperture.

Referring now primarily to FIGS. 3–5, the contact head portion 20 of expandable scanner 10 may comprise a separate assembly that is mounted to the main body portion 18 so that the contact head 20 may be moved between the extended and retracted positions 22 and 22' illustrated respectively in FIGS. 1 and 2. The contact head portion 20 may, in one preferred embodiment, comprise a generally elongate, rectangular structure having an object side 58 suitable for contacting the object 12 to be scanned. The object side 58 of contact head 20 may also be provided with an elongate slot or aperture 66 therein (FIG. 5) which generally defines an elongate scan region 68 (FIG. 3). It is preferred, but not required, that a transparent window 70 be provided within the slot 68 to prevent dirt or other foreign matter from entering the scanner 10. The interior region 72 of contact head portion 20 may be provided with a light source 74 for illuminating the scan region 68 with a plurality of light rays 78. The interior 72 of contact head 20 may also be provided with the second reflector or mirror assembly 50, as will be described in greater detail below.

As was the case for the main body portion 18, the contact head assembly 20 of expandable scanner 10 may be made from any of a wide range of materials (such as metals or plastics) suitable for the intended application. By way of example, the contact head assembly 20 utilized in one preferred embodiment also may be fabricated from a moldable polycarbonate plastic material of the type that is well-known in the art and readily commercially available.

The light source 74 used to illuminate the scan region 68 may comprise any of a wide range of light sources now known in the art or that may be developed in the future which are suitable for providing the desired degree of illumination to the scan region 68. Consequently, the present invention should not be regarded as limited to any particular type or style of light source. However, by way of example, one preferred embodiment of the expandable scanner 10 utilizes a light source that comprises a plurality of light emitting diodes (LEDs) 76 secured to a suitable board or substrate 84 so that light rays 78 produced by the LEDs 76 are directed toward the scan region 68, as best seen in FIG. 3.

The details of the lens reduction optical system 24 used to focus image light 28 from the illuminated scan region 68 onto the surface of the detector 26 are best seen in FIG. 3. The optical system 24 may comprise a first reflector or mirror 48 mounted within the main body portion 18 so that the first mirror 48 receives image light 28 from the illuminated scan region 68. The first reflector or mirror 48 is tilted or angled so that it reflects the image light 28 to a second reflector or mirror 50 mounted within the contact head portion 18. The second reflector or mirror 50 is also tilted or angled so that image light 28 from the first mirror 48 is reflected to the lens assembly 53 mounted in the main body portion 18. Thereafter, the lens assembly 53 focuses the image light 28 onto the surface of the detector 26.

The arrangement of the various elements (e.g., mirrors 48 and 50 and lens assembly 53) is such that the image light 28 will be focused on the detector 26 when the contact head portion 20 is in the extended position 22. That is, the angle at which the first mirror 48 is positioned allows the first mirror 48 to reflect image light 28 from the illuminated scan region 68 onto the surface of the second mirror 50. Similarly, the angle at which the second mirror 50 is positioned allows the second mirror 50 to direct to the lens assembly 53 image light 28 received from the first mirror assembly 48.

The specific locations and angular orientations of the first and second mirrors 48 and 50 will vary depending on the dimensions and geometrical layout of the particular expandable scanner device 10 which in which the lens reduction optical system 24 is to be used. Consequently, the present invention should not be regarded as limited to the specific locations and angular orientations of the first and second mirrors 48 and 50 that are shown and described herein. Stated another way, the specific locations and angular orientations of the first and second mirrors 48 and 50 may be easily selected by persons having ordinary skill in the art after having become familiar with the teachings of the present invention and after considering the particular size, shape, and other geometric factors associated with the expandable scanner design that is to be utilized. Moreover, since mirror and lens assemblies for scanners are well-known in the art and are generally readily commercially available, the mirrors 48 and 50, as well as the lens assembly 53, that may be utilized in one preferred embodiment of the invention will not be described in further detail herein.

The detector 26 and various electronic components 60 used to convert the image light 28 into digital image data are also well-known in the art and generally readily commercially available, thus will not be described in further detail herein. However, it should be noted that a scanner 10 according to the present invention may be constructed to produce either color image data or black and white (i.e., grayscale) image data. Generally speaking, it is preferred that an expandable scanner 10 according to the present invention be configured to produce color image data in order to take advantage of the lens reduction optical system 24 utilized in the preferred embodiment of the invention. If the scanner is constructed to produce color image data, then the various components thereof (e.g., the light source 74, detector 24, and associated electronic components 60) may comprise those shown and described in U.S. Pat. No. 4,926,041 of Boyd for "Optical Scanner" and U.S. Pat. No. 5,300,767 of Steinle et al., for "Color Image Sensing Assembly with Multiple Linear Sensors and Aligned Filters" which are incorporated herein by reference for all that they disclose. Alternatively, any of a wide range of other types of components, devices, and arrangements for producing color image data that are currently known in the art or that may be developed in the future may also be used in conjunction with the present invention, as would be obvious to persons having ordinary skill in the art after having become familiar with the teachings of the present invention.

As was described above, the contact head assembly 20 is mounted to the main body portion 18 so that the contact head assembly 20 may be moved between the extended position 22 (FIG. 1) and the retracted position 22' (FIG. 2), i.e., generally in the directions indicated by arrows 34. As was also mentioned above, the locations and alignments of the various components (e.g., mirrors 48 and 50, and lens assembly 53) of the optical system 24 are such that there exists an unobstructed and properly focused optical path between the illuminated scan region 68 and the detector 26 when the contact head 20 is in the extended position 22. However, there will not generally exist an unobstructed and properly focused optical path between the illuminated scan region 68 and the detector 26 when the contact head 20 is in the retracted position 22'.

Since the alignment of the various components (e.g., 48, 50, and 52) of the lens reduction optical system 24 is important in achieving good image quality, particularly in color scanning applications, the mounting arrangement used to secure the contact head 20 to the main body 18 should be capable of securely and consistently holding the contact head 20 at the proper extended position 22. Toward this end, the mounting system utilized in one preferred embodiment of the invention may comprise a first or front pair of elongate rod assemblies 36 and 38 located along the front side 80 of the expandable scanner 10 as well as a second or rear pair of elongate rod assemblies (only one rod assembly 40 of which can be seen in FIG. 3) located along the rear side 82 of the scanner assembly 10.

Figure 6:
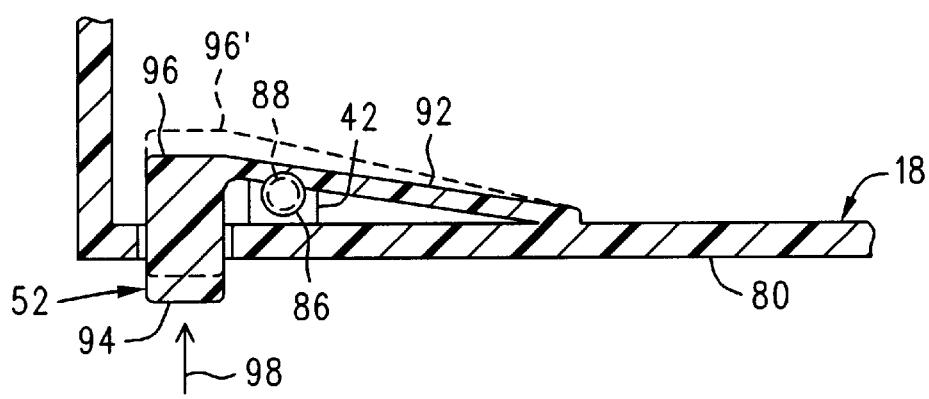
FIG. 6 is an enlarged sectional view showing the latch assembly for locking the contact head portion in the extended and retracted positions.

Referring now to FIGS. 3, 4, and 6, since each first or front rod assembly 36, 38 is identical, only the front rod assembly 36 will be described in detail. The front rod assembly 36 comprises an elongate cylindrical rod 86 the lower end of which is fixedly mounted to the contact head portion 20. The other end of rod 86 is slidably mounted to the main body portion 18 via a sliding bushing or bearing 42. The bushing 42 allows the rod 86 to slide smoothly into and out of the main body portion 18, i.e., in the directions indicated by arrows 34. The cylindrical rod 86 may also be provided with an upper groove 88 and a lower groove 90. The upper and lower grooves 88 and 90 are sized and positioned to engage the latch member 52 when the contact head 20 is located in either the extended or retracted positions 22 and 22'. Accordingly, when the latch member 52 is engaged with the upper groove 88, the contact head 20 will be locked in the extended position 22. Similarly, when the latch member 52 is engaged with the lower groove 90, the contact head 20 will be locked in the retracted position 22' (FIG. 2).

The cylindrical rod 86 may be made from any of a wide range of materials (e.g., metals or plastics) suitable for the intended application. By way of example, in one preferred embodiment, the cylindrical rod 86 is fabricated from steel, although other materials could also be used. The lower end of the rod 86 may be secured to the contact head portion 20 by any of a wide range of fastening systems or devices now known or that may be developed in the future. For example, the rod 86 may be screwed into a mounting boss 11 (FIG. 3) provided in the contact head portion 20. Alternatively, the mounting boss 11 may be "overmolded" onto the rod 86 during fabrication of the contact head 20.

The bearing member 42 for slidably receiving the cylindrical rod 86 may also comprise any of a wide range of materials suitable for the intended application. By way of example, in one preferred embodiment, the bearing member 42 may be molded as an integral portion of the main body 18 and may be bored or reamed to slidably receive the rod 86 with a minimum amount of free play or lash. Alternatively, the bearing member 42 may comprise a sintered bronze sleeve (not shown) that may be pressed into or overmolded by a suitable mounting boss (also not shown) provided in the main body portion 18.

It is generally preferred, but not required, to bias the contact head 20 in the extended position 22. By way of example, in one preferred embodiment, this may be accomplished by a pair of compression type coil springs 47 and 49 which are provided around the respective rod assemblies 36 and 38. The springs 47 and 49 required to urge the contact head 20 toward the extended position 22, may comprise any of a wide range of coil springs that are well-known in the art and that are readily commercially available. Consequently, the springs 47 and 49 that may be used in one preferred embodiment to bias the contact head 20 toward the extended position 22 will not be described in further detail herein.

The latch member 52 used to lock the contact head 20 in either the extended or retracted positions 22 and 22' is best seen in FIG. 6 and may comprise an elongate arm portion 92 attached to the interior portion of the front side 80 of the main body portion 18 so that the arm portion 92 and attached tab 94 may be moved between a locked position 96 and an unlocked position 96'. Accordingly, when a user (not shown) pushes on the tab 94 (i.e., moves the tab 94 in the direction indicated by arrow 98), the latch member 52 will moved from the locked position 96 to the unlocked position 96', thereby allowing the contact head 20 to be moved between the extended and retracted positions 22 and 22', respectively. The latch member 52 is biased toward the locked position 96. Therefore, once the user releases the tab portion 94, the latch member 52 will automatically engage the upper or lower groove 88 or 90 when the contact head reaches the retracted position 22' or the extended position 22, as the case may be.

The latch member 52 may be fabricated from any of a wide range of materials (e.g., metals or plastics) suitable for the intended application. By way of example, in one preferred embodiment, the latch member 52 is molded or formed as an integral portion of the front side 80 of main body portion 18. That is, the latch member 52 comprises the same moldable polycarbonate plastic material that forms the main body portion 18. If the foregoing material and configuration are used, the elongate arm portion 92 will be resilient and flexible, thereby biasing the latch member 52 in the locked position 96, but allowing a user to easily move the latch member 52 to the unlocked position 96' by simply pushing on the tab portion 94 in the direction indicated by arrow 98.

The other front rod assembly 38 may be identical to the rod assembly 36 just described, except that it is mounted to the other end of the scanner 10 and is slidably attached to the main body portion 18 by bearing 44. The rod assembly 38 may also be provided with upper and lower grooves which may be engaged by a corresponding latch member 54 to allow the contact head 20 to be locked in either the extended or retracted positions 22 or 22'.

The rear pair of rod assemblies (e.g., rod assembly 40 shown in FIG. 3) may be identical to the front rod assemblies 36, 38, just described, except that they need not be provided with corresponding latch assemblies. Accordingly, the rods comprising the rear pair of rod assemblies need not require upper and lower grooves. However, in an alternative arrangement, the rear pair of rod assemblies (e.g., 40) could be made substantially identical to the front pair of rod assemblies 36, 38 and provided with similar latching mechanisms (not shown) to lock the rear pair of rod assemblies in either the extended or retracted positions 22, 22'. If such an arrangement is used, it may be desirable to link together the various latch members so that all of the latch members may be simultaneously actuated by a single tab or lever (not shown), although this is not required. Such an arrangement may make it easier for a user to unlock the contact head 20 and move it between the extended and retracted positions 22 and 22'.

It is generally preferred that the expandable scanner device 10 also be provided with an expandable bellows assembly 30 which substantially encloses the space 32 created between the main body portion 18 and the contact head 20. The expanding bellows assembly 30 should be substantially opaque to prevent ambient light from entering the lens reduction optical system 24 and possibly degrading the quality of the resulting image data. It is also preferred, but not required, that the interior surfaces of the bellows assembly 30 be coated with a light absorbing material (e.g., flat black paint) to reduce specular reflections within the scanner 10.

The expanding bellows assembly 30 may be made from any of a wide range of materials (e.g., plastics or fabrics) that are readily commercially available and suitable for such an application. By way of example, in one preferred embodiment, the bellows assembly 30 is fabricated from a polyester fabric treated with Hypalon® (a registered trademark of E.I. DuPont De Nemours and Company) and having a mean thickness of about 0.020 inches. Since such treated polyester fabrics are readily commercially available, the particular fabric utilized in one preferred embodiment of the invention will not be described in further detail herein. Alternatively, other materials could also be used as would be obvious to persons having ordinary skill in the art after having become familiar with the teachings of the present invention.

The expandable scanner 10 may be operated as follows in order to scan an object 12, such as a document 14 with written text 16 provided thereon. Consider, for example, a hypothetical situation wherein the contact head portion 20 of the scanner 10 is initially in the retracted position 22'. The user (not shown) would prepare the scanner 10 for operation by moving the contact head portion 20 to the extended position 22. In the embodiment shown and described herein, this would be done by simultaneously pressing on the latch members 52 and 54 to release the respective rod members 36 and 38. The springs 47 and 49 would then automatically separate the main body and contact head portions 18 and 20, respectively, urging the contact head portion 20 to the extended position 22. When the contact head portion 20 reaches the extended position 22, the latch assemblies 52 and 54 would automatically engage their respective rod assemblies 36 and 38, thereby locking the contact head portion 20 in the extended position 22. The object 12 may then be scanned by placing the object side 58 of the contact head portion 20 in contact with the object 12 and thereafter by moving the scanner 10 in the scan direction 56, as best seen in FIG. 1. After the scanning operation is complete, the user may return the contact head portion 20 to the retracted position 22' (FIG. 2) by first releasing the latch assemblies 52 and 54 and then by pushing together the main body and contact head portions 18 and 20. Once the contact head portion 20 reaches the retracted position 22', the latch assemblies 52 and 54 would again automatically engage their respective rod assemblies 36 and 38, this time locking the contact head 20 in the retracted position 22'.

It is contemplated that the inventive concepts herein described may be variously otherwise embodied and it is intended that the appended claims be construed to include alternative embodiments of the invention except insofar as limited by the prior art.

What is claimed is:

1. Expandable scanner apparatus, comprising:

a main body;

a detector mounted within said main body;

a contact head mounted to said main body so that said contact head can be moved toward and away from said main body between a retracted position and an extended position;

a bellows mounted to said contact head and to said main body, said bellows substantially enclosing an interior region created between said main body and said contact head when said contact head is in the extended position; and an optical system operatively associated with said main body and said contact head so that said optical system focuses on said detector image light from an object being scanned when said contact head is in the extended position.

2. The expandable scanner apparatus of claim 1, further comprising:

a first elongate rod mounted to said contact head;

a second elongate rod mounted to said contact head in parallel, spaced-apart relation to said first elongate rod;

a first bearing member mounted to said main body, said first bearing member being sized to slidably receive said first elongate rod; and a second bearing member mounted to said main body, said second bearing member being sized to slidably receive said second elongate rod.

3. The expandable scanner apparatus of claim 2, further comprising a latch member mounted to said main body, said latch member being sized to selectively engage and disengage said first elongate rod when said contact head is in the extended position to lock said contact head in the extended position.

4. The expandable scanner apparatus of claim 3, wherein said first and second elongate rods comprise respective first and second cylindrical rods.

5. Expandable scanner apparatus, comprising:

a main body;

a detector mounted within said main body;

a contact head mounted to said main body so that said contact head can be moved toward and away from said main body between a retracted position and an extended position;

an optical system operatively associated with said main body and said contact head so that said optical system focuses on said detector image light from an object being scanned when said contact head is in the extended position, said optical system comprising:

a first reflector mounted within said main body so that said first reflector is aligned to reflect image light from the object when said contact head is in the extended position;

a second reflector mounted within said contact head so that said second reflector is aligned to reflect image light reflected by said first reflector when said contact head is in the extended position; and a lens mounted within said main body so that said lens is aligned to focus on said detector image light reflected by said second reflector when said contact head is in the extended position.

6. The expandable scanner apparatus of claim 5, further comprising an expandable bellows mounted to said contact head and to said main body so that said expandable bellows substantially encloses a space created between said main body and said contact head when said contact head is in the extended position.

7. The expandable scanner apparatus of claim 6, further comprising an illumination system mounted within said contact head so that light from said illumination system illuminates a scan region on the object being scanned.

8. The expandable scanner apparatus of claim 7, wherein said contact head includes an elongate aperture therein so that said elongate aperture allows image light from the object to pass into an interior region of said contact head.

9. The expandable scanner apparatus of claim 8, wherein said detector comprises a charged coupled device.

10. The expandable scanner apparatus of claim 9, wherein said illumination system comprises at least one light emitting diode.

11. Expandable scanner apparatus, comprising:

a main body;

a detector mounted within said main body;

a contact head mounted to said main body so that said contact head can be moved toward and away from said main body between a retracted position and an extended position;

a first reflector mounted within said main body, said first reflector being aligned to reflect image light from the object when said contact head is in the extended position;

a second reflector mounted within said contact head, said second reflector being aligned to reflect image light reflected by said first reflector when said contact head is in the extended position;

a lens mounted within said main body, said lens being aligned to focus on said detector image light reflected by said second reflector when said contact head is in the extended position; and an expandable bellows mounted to said contact head and to said main body, said expandable bellows substantially enclosing a space created between said main body and said contact head when said contact head is in the extended position.

12. The expandable scanner apparatus of claim 11, further comprising:

a first elongate rod mounted to said contact head;

a second elongate rod mounted to said contact head in parallel, spaced-apart relation to said first elongate rod;

a first bearing member mounted to said main body, said first bearing member sized to slidably receive said first elongate rod; and a second bearing member mounted to said main body, said second bearing member sized to slidably receive said second elongate rod.

13. A method for scanning an object, comprising:

providing a expandable scanner apparatus having a main body portion with a detector mounted therein, a contact head portion mounted to the main body portion so that the contact head portion can be moved toward and away from the main body portion between a retracted position and an extended position, a bellows mounted to the contact head and to said main body, the bellows substantially enclosing an interior region created between the main body and the contact head when the contact head is in the extended position; and an optical system operatively associated with the main body portion and the contact head portion so that the optical system focuses on the detector image light from the object being scanned when the contact head is in the extended position;

moving the contact head portion to the extended position; and moving the expandable scanner apparatus over the object.

14. The method for scanning an object of claim 13, further comprising moving the contact head portion to the retracted position after the object has been scanned.

15. Expandable scanner apparatus, comprising:

a main body;

detector means mounted within said main body for producing an output signal representative of image light incident thereon;

a contact head;

mounting means operatively associated with said main body and said contact head for allowing said contact head to be moved toward and away from said main body between a retracted position and an extended position;

bellows means mounted to said contact head and to said main body for substantially enclosing and interior region defined between said main body and said contact head when said contact head is in the extended position; and optical means operatively associated with said main body and said contact head for focusing on said detector image light from an object being scanned when said contact head is in the extended position.

16. Expandable scanner apparatus, comprising;

a main body;

detector means mounted within said main body for producing an output signal representative of image light incident thereon;

a contact head;

mounting means operatively associated with said main body and said contact head for allowing said contact head to be moved toward and away from said main body between a retracted position and an extended position;

optical means operatively associated with said main body and said contact head for focusing on said detector image light from an object being scanned when said contact head is in the extended position, said optical means comprising:

first reflector means mounted within said main body for reflecting image light from the object when said contact head is in the extended position;

second reflector means mounted within said contact head for reflecting image light from said first reflector means when said contact head is in the extended position; and lens means mounted within said main body for focusing on said detector means image light from said second reflector means when said contact head is in the extended position.

17. The expandable scanner apparatus of claim 16, wherein said mounting means comprises:

a first elongate rod mounted to said contact head;

a second elongate rod mounted to said contact head in parallel, spaced-apart relation to said first elongate rod;

first bearing means mounted to said main body for slidably receiving said first elongate rod; and second bearing means mounted to said main body for slidably receiving said second elongate rod.

18. The expandable scanner apparatus of claim 16, further comprising bellows means mounted to said contact head and to said main body for substantially enclosing a space created between said main body and said contact head when said contact head is in the extended position.

19. The expandable scanner apparatus of claim 16, further comprising latch means operatively associated with said mounting means for locking said contact head in the extended position.

* * * * *